United States Patent [19]

Trench

[11] Patent Number: 5,016,356

[45] Date of Patent: May 21, 1991

[54] SAW AND SAW BLADE FOR USE THEREIN

[76] Inventor: Anthony B. Trench, 390 Midwest Road, Scarborough, Ontario, Canada, M1P 3B5

[21] Appl. No.: 439,872

[22] Filed: Nov. 21, 1989

[30] Foreign Application Priority Data

Sep. 28, 1989 [CA] Canada .................................. 613957

[51] Int. Cl.[5] ........................ B23D 49/04; B27B 33/02

[52] U.S. Cl. .......................................... 30/393; 83/847

[58] Field of Search .............. 30/393, 355, 369, 277.4, 30/369; 83/847, 851, 854

[56] References Cited

U.S. PATENT DOCUMENTS

| | | | |
|---|---|---|---|
| 239,710 | 4/1881 | Boynton | 83/847 |
| 2,594,997 | 4/1952 | Ringgold | 30/369 |
| 3,863,342 | 2/1975 | Griffies et al. | 30/393 |
| 3,890,708 | 6/1975 | Bauer | 30/393 |
| 3,905,105 | 9/1975 | Tuke | 30/393 |
| 3,971,132 | 7/1976 | Griffies et al. | 30/393 |
| 3,978,862 | 9/1976 | Morrison | 30/393 X |
| 4,137,632 | 2/1979 | Pfanzer | 30/393 |
| 4,238,884 | 12/1980 | Walton, II | 30/393 |
| 4,240,204 | 12/1980 | Walton, II et al. | 30/393 |
| 4,255,858 | 3/1981 | Getts | 30/393 |
| 4,262,421 | 4/1981 | Bergler et al. | 30/393 |
| 4,545,123 | 10/1985 | Hartmann | 30/393 |
| 4,550,501 | 11/1985 | Moores, Jr. et al. | 30/393 |
| 4,628,605 | 12/1986 | Clowers | 30/393 |
| 4,819,334 | 4/1989 | Mongeon | 30/393 |

FOREIGN PATENT DOCUMENTS

| | | | |
|---|---|---|---|
| 502430 | 3/1939 | United Kingdom | 83/847 |

*Primary Examiner*—Douglas D. Watts
*Attorney, Agent, or Firm*—Smart & Biggar

[57] ABSTRACT

A saw is designed to support and drive saw blades such that the cutting edges of the saw blade will travel in an orbital path. The cutting edge of the saw blade is formed with first and second portions of its length which are angularly inclined with respect to one another and extend from opposite sides of an apex such that when the proximal end of the saw blade is driven the first and second portions of the saw blade will orbit in opposite directions. The saw teeth which are formed in the first and second sections are angularly inclined away from the apex so that cuttings are displaced from the apex toward the proximal end and from the apex toward the distal end of the saw blade. Two saw blades are mounted side-by-side with their proximal ends mounted on eccentric shafts which are spaced 180° from one another.

11 Claims, 7 Drawing Sheets

SAW AND SAW BLADE FOR USE THEREIN

This invention relates to power saws. In particular, this invention relates to power saws which imply a reciprocating drive blade which is driven in an orbital path.

BACKGROUND OF THE INVENTION

A variety of different types of power saw are presently available. Chain saws are popular because they are powerful and capable of operating at high speed. Chain saws are, however, hazardous to use and are only suitable for use when cutting materials such as wood.

Banded saws are also popular, however, the conventional band saw is not readily portable and it is difficult to use in confined spaces. Skill saws and jigsaws are also difficult to use in confined spaces and are not capable of forming a long deep cut.

I have found that it is possible to impart orbital and reciprocating movement to a special purpose saw blade in a manner which will permit a high speed cutting action in a saw which is capable of forming a deep kerf which has a substantial length.

I have also found that it is possible to improve the efficiency with which a saw blade removes material from a kerf by forming the blade so that the cutting edges thereof extend obliquely from opposite sides of an apex which is located between the ends of the blade and by forming the saw teeth so that they are angularly inclined in a direction away from the apex on opposite sides of the apex.

I have also found that it is possible to increase the efficiency of operation of a saw by mounting two saw blades in a side-by-side relationship and driving the saw blades in orbital paths which are out of phase with respect to one another.

According to one aspect of the present invention there is provided a saw which comprises an elongated body having a proximal end and a distal end, a cutting edge extending along the first edge of the body, said cutting edge having first and second portions of its length which are angularly inclined with respect to one another from an apex located at the junction of the first and second portions, first saw teeth formed on said first portion of said cutting edge, said first saw teeth being angularly inclined toward said proximal end, second saw teeth formed on said second portion of said cutting edge, said second saw teeth being angularly inclined toward said distal end such that, in use, when the apex of the blade rests in a kerf and the proximal end of the blade is displaced in an orbital path the first and second portions of the cutting edge will be driven in opposite orbital directions in first and second orbital cutting paths to cut and displace material in opposite directions from opposite sides of the apex.

According to a further aspect of the invention there is provided a saw blade support structure and a saw blade each having a proximal end and a distal end, said blade having a pair of cutting edges which are angularly inclined with respect to an apex which is located therebetween, coupling means slideably and pivotally connecting the distal end of the saw blade and the support means in close proximity to the apex of the cutting edge, drive means at the proximal end of the support structure engaging the proximal end of the blade and being operable to drive the proximal end of the blade in an orbital path with respect to the support structure such that the cutting edges of the saw blade are driven in opposite rotational directions in first and second orbital paths to cut and displace material in opposite directions from opposite sides of the apex in use.

According to yet another aspect of the invention there is provided a blade support structure and at least two saw blades each having a proximal end and a distal end, said saw blades each having a cutting edge and being arranged with their cutting edges located in a side-by-side relationship to form a common kerf in use, coupling means slideably and pivotally connecting the saw blades to the support structure intermediate the ends of the saw blade to permit relative movement of the saw blades with respect to the support structure and one another, drive means at the proximal end of the support structure, said drive means engaging the proximal ends of the blades and being operable to drive the proximal ends in orbital paths, the proximal ends of the saw being spaced from one another along the orbital path so as to be out of phase with one another to enhance the efficiency of the cutting action.

According to a still further aspect of the invention there is provided a saw for driving a saw blade to and fro along a cutting path, the saw blade being longitudinally elongated and having first and second cutting edges which are angularly inclined from an apex toward the proximal and distal ends of the blade respectively and pivot means located on the blade in the proximity of the apex, the pivot means having an axis about which the blade may pivot, said saw comprises a saw frame having a proximal end and a distal end, crank means at the proximal end of the frame for mounting the proximal end of the blade on the frame for orbital and reciprocal movement relative to the frame, support means on the frame remote from the crank means for supporting the pivot means of the blade for rotational movement about its axis and for reciprocating movement in the direction of the longitudinal extent of the blade.

The invention will be more clearly understood after reference to the following detailed specification read in conjunction with the drawings wherein.

Figure 1:
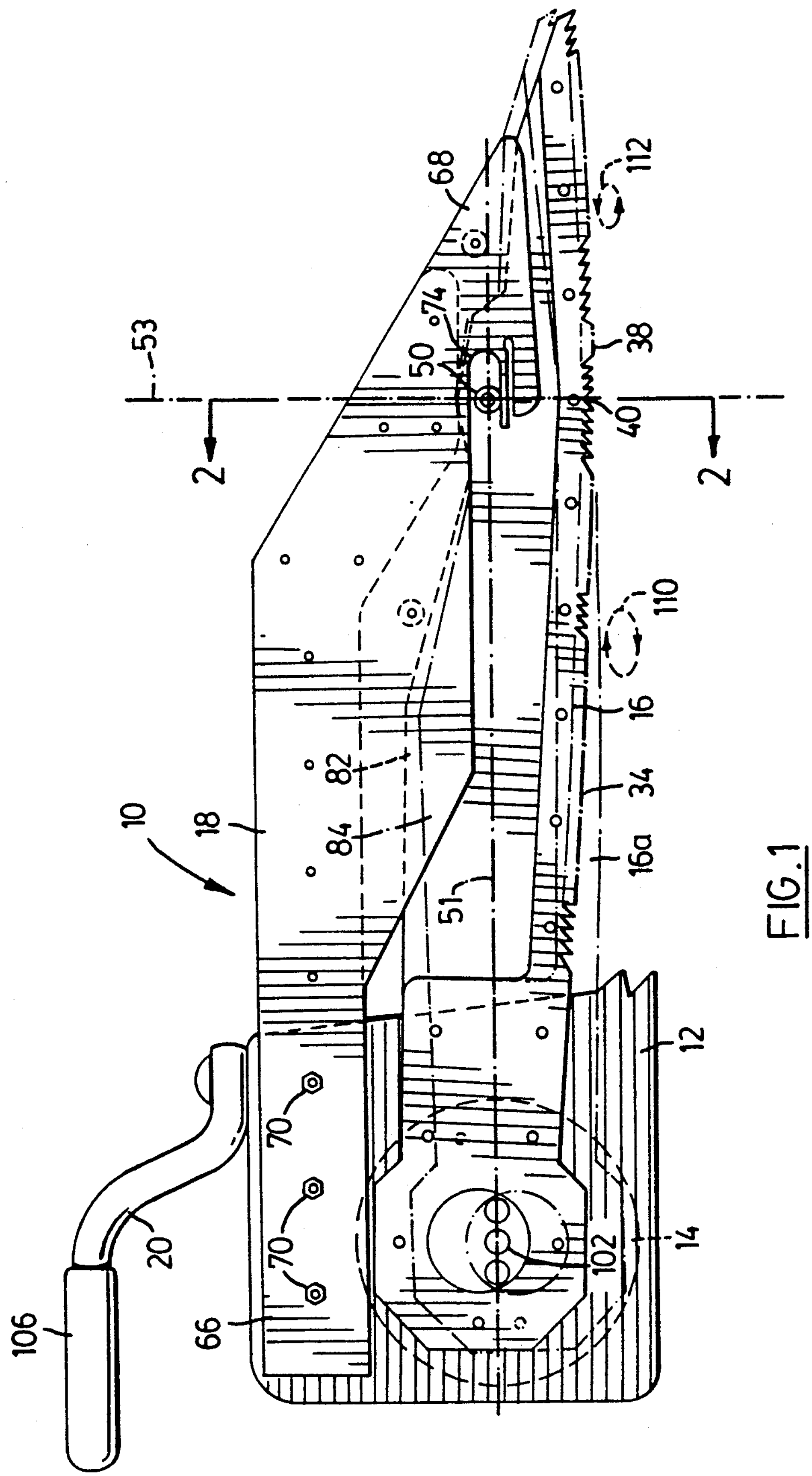
FIG. 1 is a partially sectioned side view of a saw constructed in accordance with an embodiment of the present invention.
Figure 10:
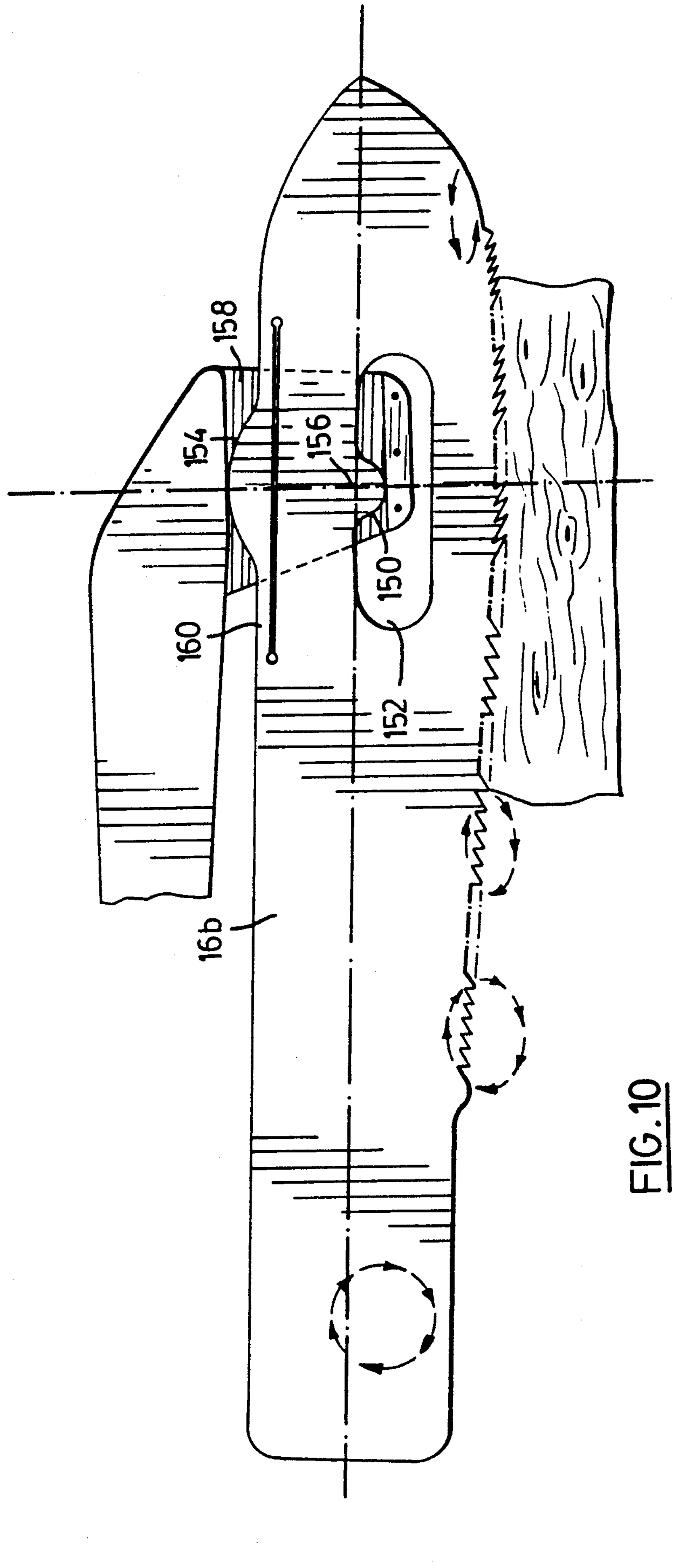

FIG. 10 is a partial side view of a blade and blade support member constructed in accordance with a further embodiment of the present invention With reference to FIG. 1 of the drawings, the reference numeral 10 refers generally to a saw which is constructed in accordance with an embodiment of the present invention. The saw consists of a main frame 12, a drive motor 14 blade assemblies 16 and 16*a*, a blade support member 18, handle assembly 20 and an eccentric drive shaft assembly 102 which serves to drivingly connect the blade assemblies to the motor.

Figure 4:
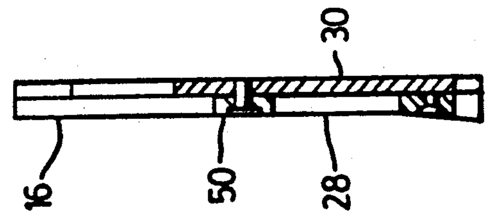
FIG. 4 is a sectional view of the blade taken in the direction of the arrows 4—4 of FIG. 3.

The saw blade 16 will now be described with reference to FIGS. 3 and 4 of the drawings. The saw blade 16 has a proximal end 24 and a distal end 26. The saw blade assembly 16 comprises a first component 28 and a second component 30. The first component 28 has, as shown in FIG. 4 a greater thickness than the second component 30. The components 28 and 30 are mounted in a side-by-side relationship and are attached to one another by a plurality of rivets 32. The first component 28 contributes the rigidity to the blade assembly which is required to enable the blade to function effectively as a saw blade. The second component 30 acts as a guide which fits in a close fitting sliding relationship within a channel formed in the blade support member 18 as will be described hereinafter.

A cutting edge 34 is formed along the lower edge of the first and second components 28 and 30. The cutting edge 34 has first and second portions 36 and 38 of its length which are angularly inclined from an apex 40, a plurality of saw teeth 42 are formed along the first portion 36 of the cutting edge. The saw teeth 42 are angularly inclined toward the proximal end 24 of the blade assembly. Saw teeth 44 are formed on the second portion 38 of the cutting edge and are angularly inclined toward the distal end 26.

The second component 30 has an upper edge 46 which is contoured to provide a rocker bearing surface 48 which has an apex which is aligned with the apex 40 of the cutting edge 34. A boss 50 is mounted on and projects laterally from the outer side face 52 of the second component. The boss 50 is located on the centre line 54 which extends between the apex 40 and the apex 48. The boss 50 functions as a guide member which cooperates with the blade support member as will be described hereinafter.

A blade mounting passage 56 is formed in the proximal end 24 of the blade.

Figure 3:
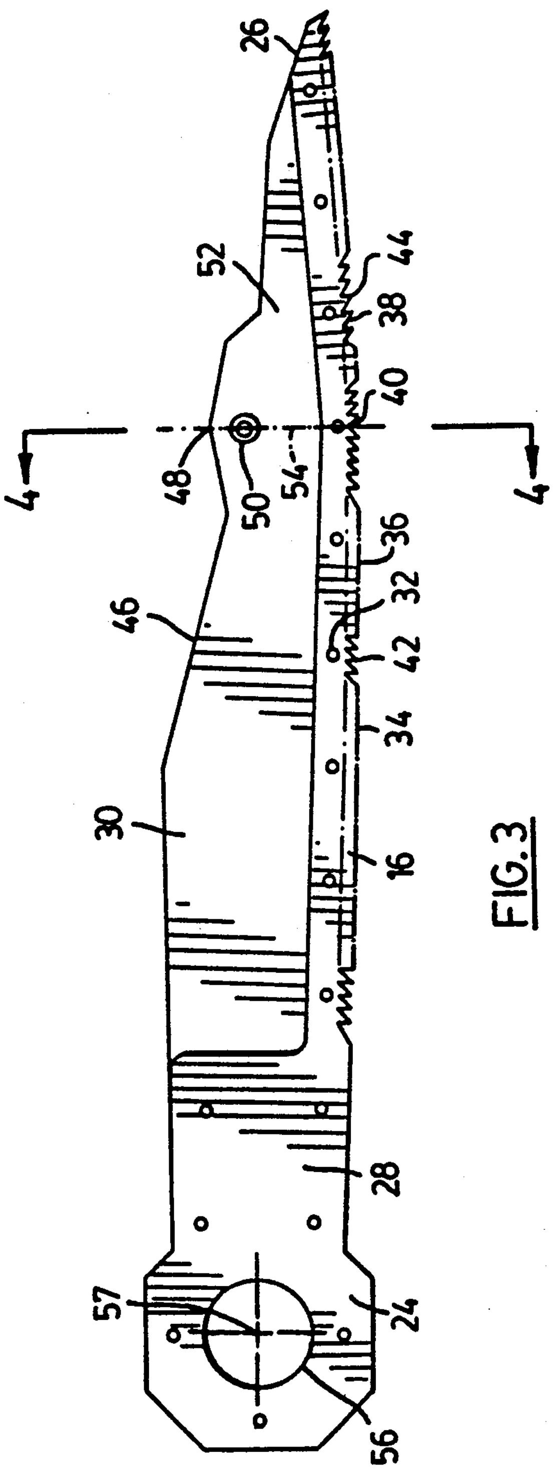
FIG. 3 is a side view of the saw blade of FIG. 1.

The blade 16 which is illustrated in FIGS. 3 and 4 of the drawings is a right-hand blade, that is to say, it is intended to be mounted on the right-hand side of the blade 16*a* and consequently the saw teeth 44 and 42 have a conventional side bias to the right-hand side of the assembly.

Figure 2:
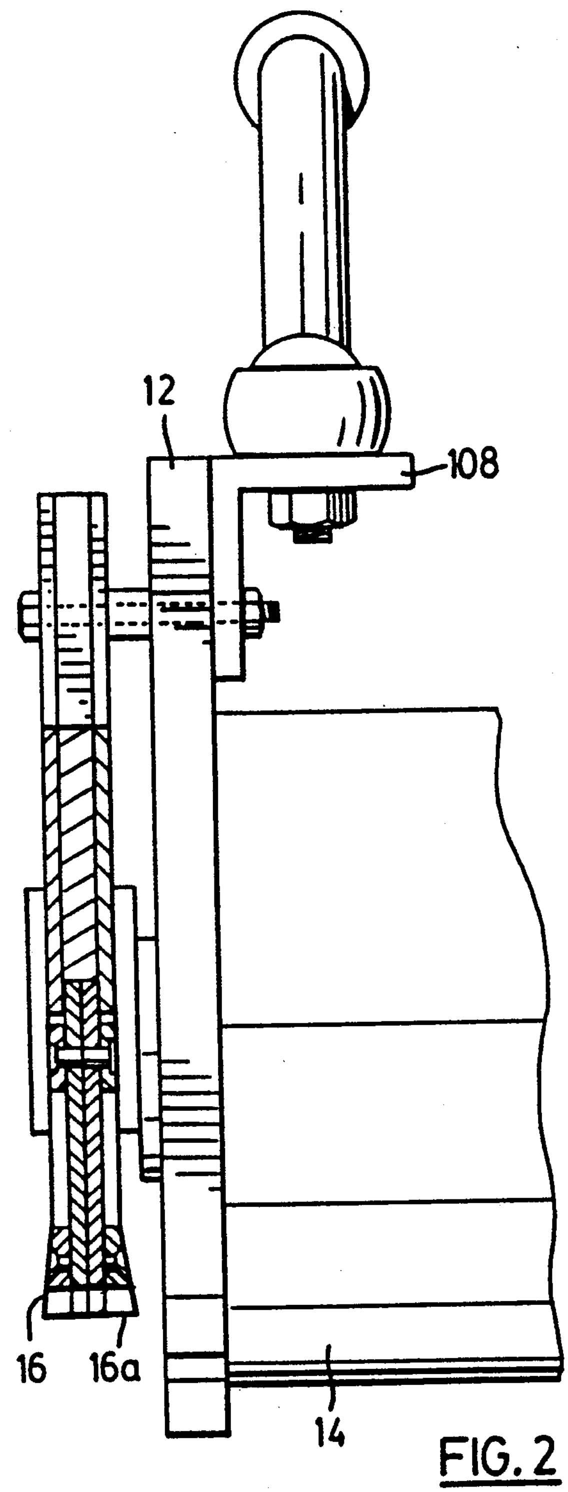
FIG. 2 is a sectional view taken along the line 2—2 of FIG. 1.

The blade 16*a* is a left-hand blade as shown in FIG. 2 of the drawings and is otherwise identical to the blade 16 and will not therefore be described in detail.

Figure 5:
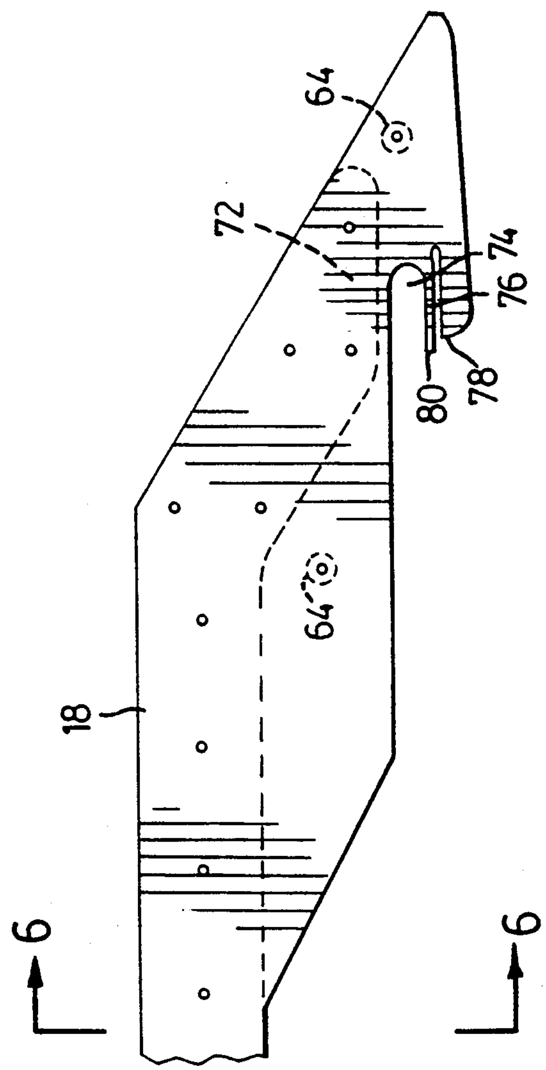
FIG. 5 is a side view of a portion of the support member of the frame.
Figure 6:
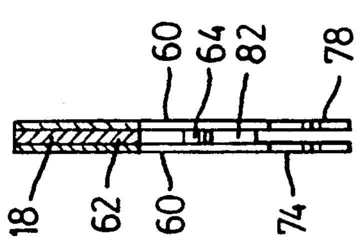
FIG. 6 is a sectional view taken in a direction of the arrows 6—6 of FIG. 5.

The blade support member 18 will now be described with reference to FIGS. 5 and 6 of the drawings wherein it will be seen that it comprises a pair of side plates 60, a main spacer plate 62 and a pair of small spacer bosses 64.

As shown in FIG. 1 of the drawings, the blades support member 18 has a proximal end 66 and a distal end 68. The proximal end 66 is mounted on the main frame plate 12 by means of a plurality of set screws 70. The blade support member 18 projects forwardly from the main frame 12 and forms a cantilever which serves to support and transmit load to the saw blade assemblies. Referring once more to FIGS. 5 and 6 of the drawing, it will be seen that the main spacer plate 62 has a bearing face 72 located at the distal end thereof which extends in a straight line. The side plates 60 each have a notch 74 which is formed in the distal end thereof and opens toward the proximal end. The lower face 76 of the notch forms a second bearing face which is oppositely disposed with respect to the bearing face 72. The bearing faces 72 and 76 cooperate with one another to form a bearing slipway which cooperates with the boss 50 in order to form a coupling assembly which slideably and pivotally connects the distal end of the saw blade to the distal end of the support to permit reciprocating movement of the boss 50.

In accommodate minor variations to the proportions of the boss member 50 a narrow slot 78 is formed in the side plates 60. The slot 78 extends parallel to the notch 74 and serve to form a resilient wall 80 therebetween. As shown in FIG. 6 of the drawings, a slipway passage 82 is formed between the side plates 60 and as shown in FIG. 1 of the drawings the upper margin 84 of the second components 30 of the saw blades are slideably mounted in the slipway 82 when the boss members 50 are slideably mounted in the notches 74.

Figure 8:
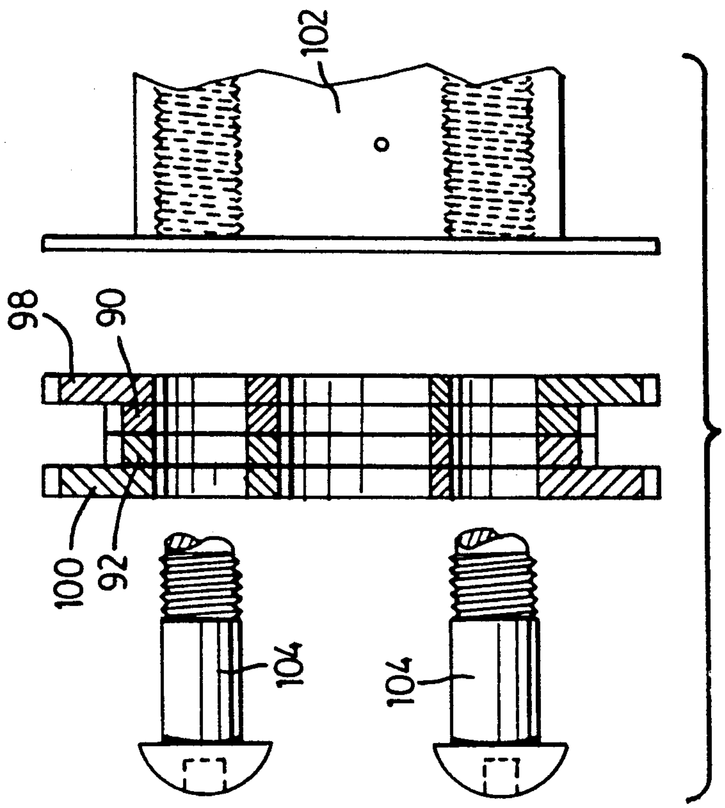
FIG. 8 is an exploded view showing the manner in which the eccentric cams are mounted on the output shaft of a motor, the eccentric shafts being shown in cross-section.
Figure 7:
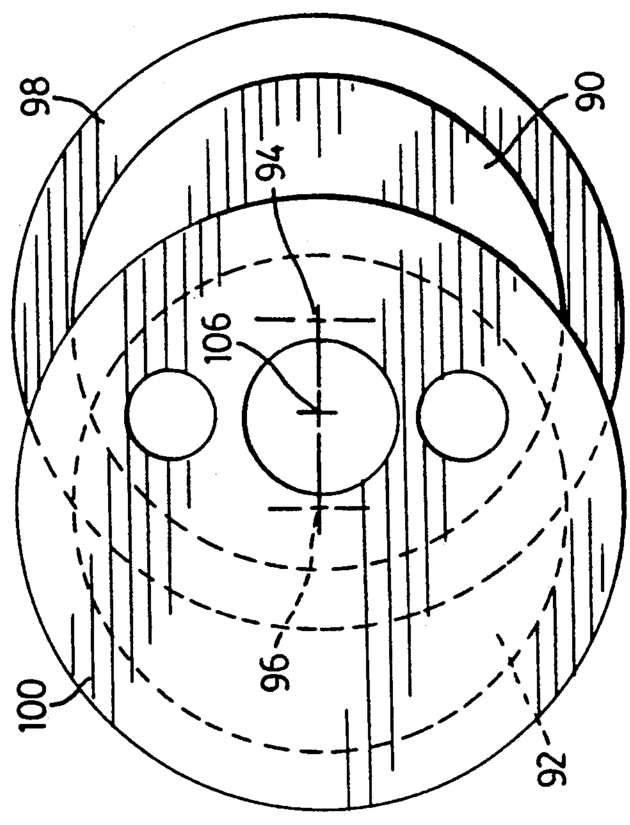
FIG. 7 is a front elevation of the eccentric drive shafts of the drive mechanism.

The eccentric drive mechanism will now be described with reference to FIGS. 7 and 8 of the drawings. The eccentric drive mechanism comprises a pair of circular drive plates 90 and 92 which have central axes 94 and 96 which are laterally spaced from one another. The plates 90 and 92 are located in a face-to-face relationship and blade retainer plates 98 and 100 are located one on either side of the drive plates or cams 90 and 92. The drive plates 90 and 92 and retainer plates 98 and 100 are secured to the power output shaft 102 of the drive motor 14 by means of mounting screws 104 such that the drive plate assembly may be rotatably driven about the axis 106 of the power output shaft 102. As shown in FIG. 7 of the drawings, the central axis 94 and the central axis 96 of the drive plates are uniformly spaced from the axis 106 and are located 180° out of phase with respect to the axis 106. As a result rotation of the power output shaft 102 about its axis 106 causes the drive plates 90 and 92 to orbit around the axis 106 to function as a crank mechanism which serves to convert the rotational motion of the output shaft 102 into orbital and reciprocal motion which is transmitted to the proximal end of the saw blades 16 and 16*a*.

The handle assembly 20 comprises a handle member 106 mounted on an angle bracket 108 which is in turn mounted on the main frame 12.

In use the saw is assembled as shown in FIGS. 1 and 2 of the drawings with the proximal ends of the saw blades mounted on the eccentric drive shafts are drive plates 90 and 92 and the boss members 50 located in the notches 74. The upper marginal edge portions 84 of the blades are slidably mounted in the slipway passage 82 of the blade support member 18.

When the motor 14 is activated by operating an ON/-OFF switch (notch 1) the output shaft 102 is rotatably driven about the axis 106. As a result the drive plates 90 and 92 are caused to orbit about the axis 106. This orbital motion is imparted to the proximal ends of the blades 16 and 16*a*. The boss members 50 and the apex 48 of the bearing surface of the upper edge of the blades engage the impairing surfaces 72 and 76 of the blade support member and serve to limit the movement of the apex 40 of the blades to a substantially linear reciprocating movement. Simultaneously the cooperative relationship between the eccentric drive mechanism and the coupling mechanism which couples the blades to the blade support causes orbital movement of the first and second portions 36 and 38 of each cutting blade. The direction of orbital rotation of the first portion 34 is shown in an exaggerated orbit 110 illustrated in FIG. 1 in which the direction of rotation is shown as being clock-wise in response to clock-wise rotation of the output drive shaft 102. A similar orbital path 112 serves to illustrate diagrammatically and to an exaggerated extent the orbital motion of the second portion 38 of the cutting edge. It will be seen that the direction of orbital rotation is opposite to that of the direction of rotation in the orbit 110. As a result the primary cutting action of the first cutting edge 34 of each saw is achieved when the saw blades are moving in the direction of the proximal end of each blade while the primary cutting action of the second portion 38 is achieved when the saw blades are moving in the direction of the distal end of each blade. As a result in use the debris such as saw dust which is generated by the cutting action is cleared from the kerf in opposite directions on opposite sides of the apex 40. This permits the saw blades of the present invention to be used to form a long kerf in the body which is to be cut by the saw. By reason of the shape of the cutting edge of the saw blades and the path in which the cutting edges are caused to move in use each cutting edge will be seen to rock about its apex 40 and will describe an orbital path of increasing proportions from the apex 40 to the proximal and distal ends thereof. The apex 40 forms the primary point of contact with the workpiece. The movement of the blade is guided in such a manner that it is possible to maintain contact between the apex and the kerf. The term "kerf" as used herein means the base of the cut-groove of the workpiece. The blade is caused to simultaneously rock about the apex 40 while the apex itself is forced to reciprocate in short straight-line motion along the kerf. The rocking and reciprocating motion together cause the teeth of the blade on either side of the apex to describe oval-shaped orbits of overlapping projectories. The teeth closest to the proximal end of each blade will describe a near circular shaped orbit while those close to the apex will move in an orbit which approaches a straight line. The same sized orbits occur for symmetrically placed teeth on opposite sides of the apex. The orbital paths are continuously graded in accending depths, (minor-axis) as the distance increases on either side of the apex, however, the length (major-axis) of each orbit remains constant throughout the cutting edge. As previously indicated the orbit of the teeth on the first portion of the cutting edge rotates in an opposite direction to that of the orbit of the teeth on the second portion of the cutting edge. This clock-wise and counter clock-wise motion of the teeth of each blade ensures that the teeth act like claws stepping-over and driving-out the debris such as saw dust in opposite directions from the apex to the outer ends of the kerf. The discharge volume of debris increases with the distance (in both directions from the apex) as more and more teeth add their cuttings to the flow. The provision of two similar adjacent blades are arranged with their proximal ends diametrically opposed to one another serves to obtain a dynamic balance.

The clawing action of the teeth is further enhanced by the graded accending depths of the orbits which accommodate the increasing volume of the discharge. It should be noted, however, that the apex itself is reciprocating and the teeth which are located immediately on either side of the apex will traverse the same portion of the kerf.

It will be noted that the axis of the boss 50 forms a pivot-point which is located on the longitudinal axis 51 of the saw blade which is defined as a line passing through the axis of the output shaft of the motor and extending the length of the blade. This longitudinal axis is considered to be stationary relative to the frame as shown in FIG. 1. A further requirement for the geometry is that the apex 40 and the pivot-point of the boss 50 are both located on a line 53 which extends perpendicular to the axis 51. Accordingly, the pivotal axes of the blades will move in parallel straight-line paths. The angled cutting edge portions 34 and 38 are inclined so as to cause the tangent-line to the base of the various teeth orbits, on either side of the apex, to lie essentially parallel to the axis 51. This is not, however, an essential feature although it serves to form a straight-line kerf to be cut throughout its entire length, which enables the operator to usually move the saw manually in the direction of the longitudinal axis 51. If the angled cutting edges are not arranged in this relationship a non-linear kerf would result. It will, however, be understood that there are many applications in which a non-linear kerf may be perfectly acceptable.

It will be apparent from the foregoing that the reciprocating motion of the pivot-point along the axis 51 results from the fixed guide faces 72 and 76 of the blade support member. Various modifications of this guide structure are possible, however, it is desirable to retain the reciprocating motion of the pivot point.

Because of the dynamic balance which is obtained by using two blades which are arranged in a side-by-side relationship and which are arranged to be driven in orbital paths 180° out of phase with respect to one another it is possible to drive the blades at high speed without generating vibrations which make the saw assembly difficult to handle.

Figure 9:
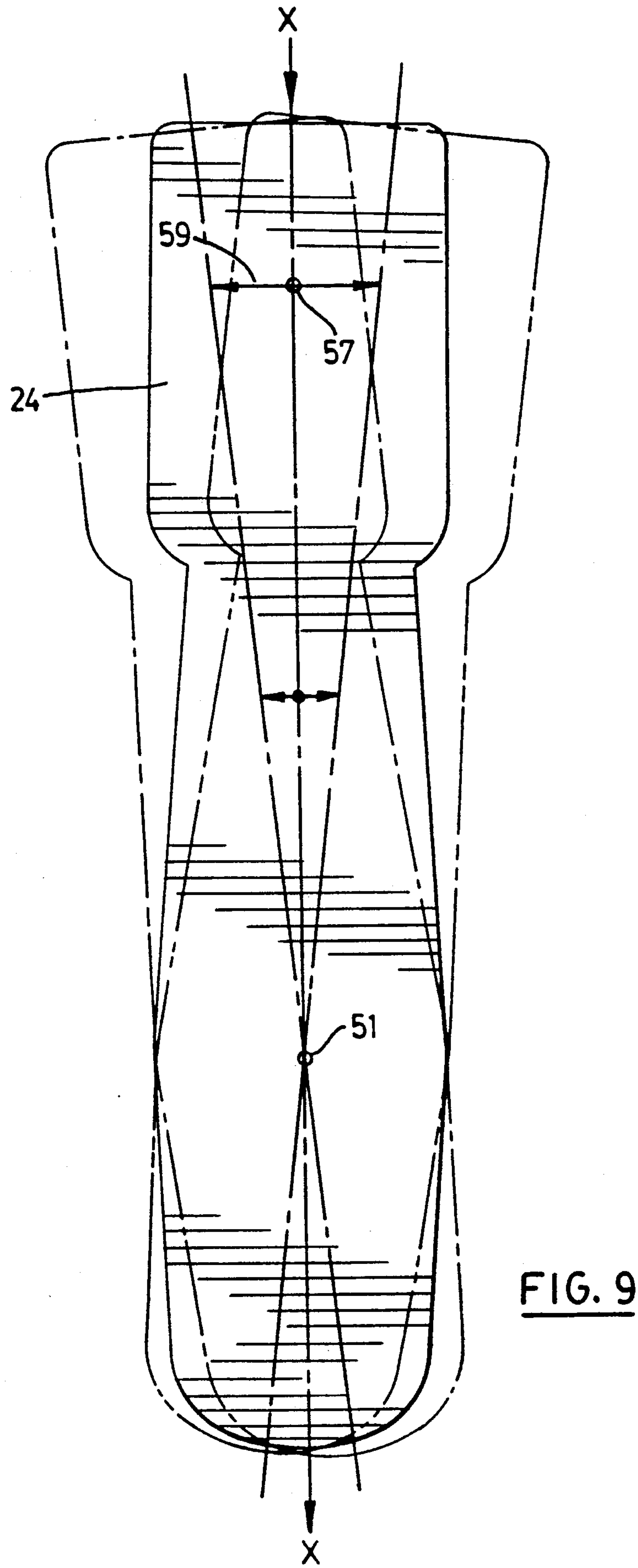
FIG. 9 is a front view of a blank suitable for use in forming a saw blade illustrating the manner in which it may be suspended in order to locate the natural pivot-point of the distal end of the blade.

The pivot-point of the axis of the bosses 50 are preferably located so as to approximately coincide with what may be called the "natural pivot-point" of the blade. As shown in FIG. 9 of the drawings, the natural pivot-point of the blade can be located by suspending a blade **16*b* so that it is free to pivot about the axis 57. The axis 57 is then caused to reciprocate to and fro along the path 59 so that the proximal end 24 of the blade is caused to move to and fro between the broken line outlines illustrated in FIG. 9. As a result of this movement, it will be observed that there is a natural pivot-point 51 which remains stationary. When this natural pivot-point 51 is identified it is used to form the location of the axis of the boss 50**.

It will be apparent that the natural pivot-point will vary depending upon the shape of the blade and consequently it is possible to adjust the position of the natural pivot-point by changing the shape of the portions of the blade which are not pre-determined by the disposition of the inclined cutting edges. While locating the axis of the boss members 50 on the natural pivot-point the blades will tend to move naturally along the guides without exerting significant dynamic transverse forces to the bearing surfaces and hence the wear is minimized and the tendency to oscillate at resonance is virtually eliminated. By using adjacent counter-balanced blades the transverse resonance in the direction normal to the longitudinal and vertical axes of the blades is also inhibited.

Various other modifications of the present invention will be apparent to those skilled in the art. One such further modification is illustrated in FIG. 10 of the drawings wherein it will be seen that the boss 50 is replaced by a rounded lug 150 which projects into an elongated slot 152 formed in the blade **16*b* and a rounded lug 154 which projects upwardly from the upper edge of the blade. The lugs 150 and 154 each have an arc of curvature generated from the natural pivot-point 156. The blade support member has a channel 158 formed therein in which the blades are slideably mounted so as to provide for the reciprocating movement and pivotal movement as previously described. A slot 160** is formed in the blade so that the blade will be sufficiently resilient to accommodate variations in size resulting from expansion or contraction of the blade or wear of the blade in use.

It will also be apparent that the saw of the present invention may have only one blade or more than two blades. The blade support structure illustrated in FIG. 10 is capable of accommodating more than two blades. When more than two blades are used the eccentric drive shafts are uniformly spaced from one another to achieve dynamic balance.

These and other modifications to the present invention will be apparent to those skilled in the art.

I claim:

1. A saw blade comprising:

(a) an elongated body having a proximal end and a distal end, a cutting edge extending along the first edge of the body, said cutting edge having first and second portions of its length which are angularly inclined with respect to one another from an apex located at the junction of the first and second portions, (b) first saw teeth formed on said first portion of said cutting edge, said first saw teeth being angularly inclined with respect to the first portion of the cutting edge in a direction toward said proximal end, (c) second saw teeth formed on said second portion of said cutting edge, said second saw teeth being angularly inclined with respect to the second portion of the cutting edge in a direction toward said distal end such that, in use, when the apex of the blade rests in a kerf and the proximal end of the blade is displaced in an orbital path the first and second portions of the cutting edge will be driven in opposite orbital directions in first and second orbital cutting paths to cut and displace material in opposite directions from opposite sides of the apex.

2. A saw blade as claimed in claim 1 further comprising pivot means located above the apex for pivotally supporting said blade so that it can rock to and fro about the apex to accommodate the orbital movement of the first and second portions of the cutting edge.

3. A saw comprising;

(a) a saw blade support structure and a saw blade each having a proximal end and a distal end, (b) said blade having a pair of cutting edges which are angularly inclined with respect to an apex which is located therebetween, (c) coupling means slideably and pivotally connecting the distal end of the saw blade and the support means in close proximity to the apex of the cutting edge, (d) drive means at the proximal end of the support structure engaging the proximal end of the blade and being operable to drive the proximal end of the blade in an orbital path with respect to the support structure such that the cutting edges of the saw blade are driven in opposite rotational directions in first and second orbital paths to cut and displace material in opposite directions from opposite sides of the apex in use.

4. A saw comprising;

(a) a blade support structure and at least two saw blades each having a proximal end and a distal end, (b) said saw blades each having a cutting edge and being arranged with their cutting edges located in a side-by-side relationship to form a common kerf in use, (c) coupling means slideably and pivotally connecting the saw blades to the support structure intermediate the ends of the saw blade to permit relative movement of the saw blades with respect to the support structure and one another, (d) drive means at the proximal end of the support structure, said drive means engaging the proximal ends of the blades and being operable to drive the proximal ends in orbital paths, the proximal ends of the saw blade being spaced from one another along the orbital path so as to be out of phase with one another to enhance the efficiency of the cutting action.

5. A saw as claimed in claim 4 wherein the proximal ends of the blades are spaced 180° from one another about the axis of the orbital path so as to be substantially dynamically balanced at the proximal ends.

6. A saw comprising;

(a) a portable frame, (b) a motor mounted on the frame, said motor having a power output shaft which is rotatable about a first axis, (c) first and second eccentric shafts mounted on said power output shaft for orbital movement in a driving orbit about said first axis, said first and second eccentric shafts being 180° out of phase with respect to one another in the driving orbit, (d) first and second saw blades each having a proximal end and a distal end, said saw blade having a cutting edge which has first and second portions which are angularly inclined with respect to one another from an apex located therebetween, said first portion of said cutting edge extending from the apex toward said proximal end of the blade and said second cutting edge extending from the apex toward the distal end of said blade, first and second saw teeth on said first and second saw edge respectively, said first saw teeth being inclined toward the proximal end of the blade to cut and clear a kerf as the blade is driven in the direction of the proximal end, said second teeth being inclined toward said distal end of said blade to cut and clear the kerf as the blade is driven in the direction of the distal end of the blade, the proximal ends of the first and second blades being mounted on the first and second eccentric shafts respectively for movement in said driving orbit, (e) a blade support member on the main frame, said blade support member having a distal end remote from the power output shaft, coupling means connecting the distal end of the blade support means to each of said blades adjacent the apex of each blade for independent pivotal and reciprocal movement of the blades with respect to the blade support whereby, in response to orbital movement of the proximal ends of the saw blade, the first and second cutting edges of each blade are subjected to counter rotational orbital cutting movement and wherein the orbital cutting movement of the first saw blade is 180° out of phase with respect to that of the second cutting blade such that the saw teeth of the first blade are operating in the opposite direction to the saw teeth of the second cutting blade in use.

7. A saw as claimed in claim 6 wherein the blade support means is releasably secured to said main frame.

8. A saw as claimed in claim 6 further comprising a manually engageable handle mounted on the main frame by which the saw may be manually supported in use.

9. A saw as claimed in claim 6 wherein the saw blades each have a second longitudinal edge which is spaced from the cutting edge wherein the blade support member has a mounting channel formed therein in which the second edges of the blades are slideably mounted such that the blade support serves to braze the saw blades against lateral deflection.

10. A saw as claimed in claim 6 wherein the coupling means comprises a guide channel having upper and lower faces which extend in the direction of reciprocation of the blades, the upper face being remote from the apex of the cutting edge, and wherein first and second pivot mean is provided on said first and second blades respectively, said first and second pivot means being slideably mounted in said guide channel so as to permit said reciprocating and pivotal movement of said blade and bearing against the lower face of said channel to retain said blades therein, said blades each having an upwardly convex rocker face disposed opposite the upper face of the guide channel for rocking engagement therewith when the blades pivot about their pivot means as the pivot means is reciprocally driven in the guide channel in use.

11. A saw comprising:

(a) a frame having a proximal end and a distal end, (b) orbital crank means mounted at the proximal end of the frame for orbital movement, said crank means being adapted to support and operable to impart orbital movement to one end of a saw blade in use, (c) support means on the frame remote from the orbital crank means forming a second support which is adapted to accommodate pivotal and reciprocal movement of a saw blade in use, and (d) said frame having a bridge portion that extends in a spaced relationship with respect to a cutting path which is located between the crank means and the support means, said cutting path being an orbital path in which a cutting edge of a saw blade is driven by the saw in use.

* * * * *